May 18, 1971 MICHIO TAMURA 3,579,335

METHOD FOR MANUFACTURING COLOR TELEVISION RECEIVER TUBES

Filed March 31, 1967 3 Sheets-Sheet 1

INVENTOR.

Michio Tamura

BY Hill, Sherman, Meroni, Gross & Simpson ATTORNEYS

INVENTOR.
Michio Tamura
BY Hill, Sherman, Meroni, Gross & Simpson
ATTORNEYS

METHOD FOR MANUFACTURING COLOR TELEVISION RECEIVER TUBES

INVENTOR.
Michio Tamura
BY Hill, Sherman, Meroni, Gross & Simpson
ATTORNEYS

United States Patent Office 3,579,335

Patented May 18, 1971

3,579,335

METHOD FOR MANUFACTURING COLOR TELEVISION RECEIVER TUBES

Michio Tamura, Kanagawa-ken, Japan, assignor to Sony Corporation, Tokyo, Japan

Continuation-in-part of application Ser. No. 540,671, Apr. 6, 1966, now Patent No. 3,437,482. This application Mar. 31, 1967, Ser. No. 627,521

Claims priority, application Japan, Apr. 2, 1966, 41/20,606

Int. Cl. G03c *5/00*

U.S. Cl. 96—36.1 10 Claims

ABSTRACT OF THE DISCLOSURE

A method for manufacturing color television screens for cathode ray tubes comprising the steps of printing a shadow image of a post-deflection-focusing grid on a plate, positioning the optical mask relative to a face plate in accordance with a spurious pattern resulting from light interference, and forming color phosphors on the face plate.

CROSS REFERENCE TO RELATED APPLICATION

This invention is a continuation-in-part application of U.S. Pat. application Ser. No. 540,671, filed Apr. 6, 1966, now U.S. Pat. 3,437,482.

FIELD OF THE INVENTION

This invention relates to methods for producing color television screens for cathode ray tubes used in color television reception and particularly to the manufacture of striped screen surfaces of the type used in post-deflection-focusing type cathode ray tubes.

PRIOR ART

In a post deflection-focusing cathod ray tube such as the "Chromatron" a large number of generally parallel grid wires are arranged in a generally planar surface spaced a short distance from a screen formed to have interwoven generally parallel strips of different colored light emitting phosphors. The grid is positioned within the cathode ray tube between the screen and the cathode.

In practice, the phosphor strip of the screen of such a color television tube is not formed to be precisely parallel because of electron beam distortion generated by the deflection of the beam in scanning, the geometry of the tube, and the distortion of the electron beam trajectory in the space between the grid and the screen. This latter distortion is increased with the greater deflection angle of the electron beam.

The position of the phosphor strips is normally altered to eliminate or reduce the adverse effects of the distortions. Because of the varying degree of these effects, the precise arrangement of the phosphor strips to correct this varies in a manner which is quite complicated.

Accordingly, in the production of the phosphor strip screen, quite a difficult manufacturing process is involved. Such screens are normally formed by a photographic-type process in which an optical mask is placed between a light source and a sensitized screen face plate. The light exposes part of a sensitized screen surface which surface part is subsequently coated with a phosphor of a primary color. The process is repeated until an entire phosphor screen is formed on the face plate.

Furthermore, in the production of the phosphor strips on a tube screen, the use of an optical mask, the positioning of the optical mask relative to the parallel grid wires is very difficult. For this positioning, one prior method has been disposing the optical mask opposite the face plate and having mounted thereon the parallel grid wires. The light is used to project the pattern of the mask while at the same time adjusting the location of the optical mask such that a spurious pattern, the moire pattern, produced by interference of light between the patterns of the mask and the parallel grid appears in a manner predetermined to correspond with the optimum arrangement.

This method is defective, however, since the spurious pattern is so complicated that the positioning of the optical mask relative to the grid cannot be carried out with great accuracy. Moreover, this method requires considerable time on the part of the person carrying out the operation and often leads to non-uniformity in the quality of the printed screen.

To avoid the above difficulties an electron beam printing method has been proposed. By this manufacture method an electron beam is focused on the screen which has been coated with an organic photosensitive material. The electron beam is generated under the same conditions as those employed in natural operation of the finished color picture tube in order to leave phosphors emitting predetermined colors at predetermined locations. However, this method involves manufacturing processes under high vacuum conditions and is not suitable for mass production.

SUMMARY

This invention is directed to a method for manufacturing a color phosphor screen by an optical method employing a printed plate which has formed thereon a pattern corresponding to that formed on a plate by electron beam printing. In order to accomplish this, a post-deflection-focusing grid is mounted on the plate and a shadow image of the post-deflection-focusing grid is printed by light through the grid. A face plate is adjusted with respect to the optical mask in accordance with a light interfereence pattern. The face plate is then given a coating of a phosphor slurry and the coated inner face of the face plate is irradiated by light through the optical mask in order to fix the position of the phosphor stripes for each phosphor strip to be formed thereon.

An object of the invention is to provide a method of manufacturing a color phosphor screen by adjusting the positions of an optical mask relative to a face plate precisely.

Another object of the present invention is to provide a method of manufacturing a color phosphor screen in which the color phosphor screen can be produced in accordance with the configuration of the post-deflection-focusing grid to be used with the screen.

Another object of the invention is to provide a method of manufaturing a color phosphor screen for a color television tube of the post-deflection type which avoids one or more of the limitations of the prior methods of manufacturing.

Another object of the invention is to provide a method for the manufacture of color phosphor screens which is suitable for mass production.

Another object of the present invention is to provide a a method for the manufacturing of color television screens which is new and improved.

Many other advantages, features and additional objects of the present invention will become manifest to those versed in the art upon making reference to the detailed description and accompanying sheets of drawings in which preferred structural embodiments incorporating the principles of the present invention are shown by way of illustrative example.

Figures 11, 12:
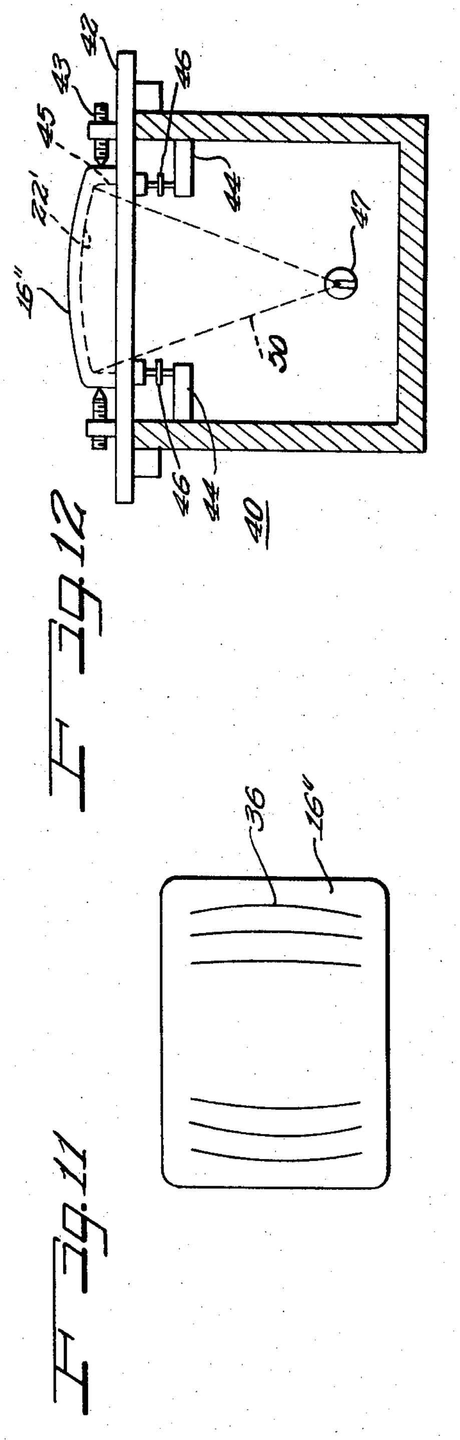

FIG. 11 schematically illustrates the morie pattern appearing on the face plate;

FIG. 12 schematically illustrates an exposing device employed in the process of the formation of color phosphor strips on the face plate; and FIGS. 13A to 13E are diagrammatic showings of the steps involved in the process of coating the inner face of the screen.

As shown in the drawings:

The principles of the present invention are particularly useful when used in the manufacturing of a three-gun color picture tube generally indicated by the numeral 11.

The tube 11 comprises a glass envelope formed from a cylindrical neck portion 12 within which is disposed an electron gun device 13 having three electron guns 13B, 13G and 13R, and a conical portion 14 connects the neck portion 12 with generally planar face plate 16. Mounted about the neck portion 12 is a deflection device 15. On the inner face of the face plate 16 is a multi-color phosphor screen 17. Disposed between the deflection device 15 and the multi-color phosphor screen 17 is a post-deflection-focusing grid 18.

Figures 1, 2, 3, 4, 6:
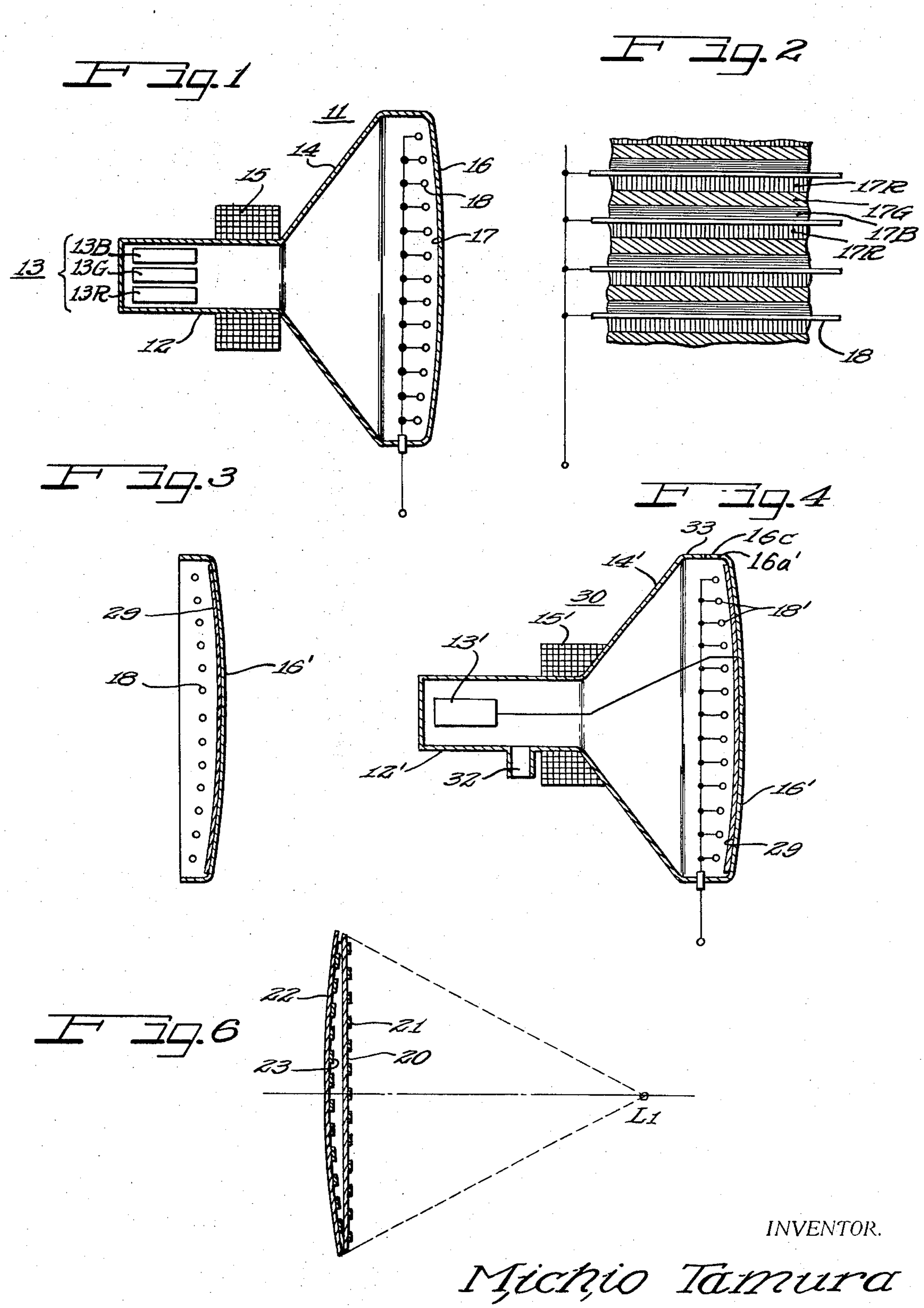
FIG. 1 is a longitudinal cross-sectional view schematically illustrating a three-gun color picture tube.
FIG. 2 is a partial enlarged inside plan view of the screen of the tube of FIG. 1, showing the relative arrangement of color phosphor strips and grid elements.
FIG. 3 is a schematic cross-sectional view of a plate and associated parts similar to that of the tube of FIGS. 1 and 2 which plate is to be used in the process of forming an optical mask in accordance with one feature of the invention.
FIG. 4 is a longitudinal cross-sectional view schematically illustrating an apparatus and step including the plate of FIG. 3 in the making of the optical mask.
FIGS. 5 and 6 are schematic diagrams showing the process of forming an optical mask.

The electron gun device 13 consists of the three electron guns 13R, 13G and 13B which are supplied with red, green and blue color signals respectively, and emit three density-modulated electron beams. The multi-color phosphor screen 17 is composed of a plurality of red light emitting phosphor strips 17R, green light emitting phosphor strips 17G and blue light emitting phosphor strips 17B which are sequentially arranged in a repeating cyclic order of red-green-blue-red, as shown in FIG. 2. All the grid elements of the grid 18 are supplied with the same voltage and focus electron beams to impinge upon the red, green and blue phosphor strips in accordance with their incident directions. The grid 18 is usually framed and detachably mounted within the tube 11 in opposing relation to the color screen 17 at a preselected position.

In the manufacture of the color screen 17, the first step is making an optical mask having formed thereon a striped pattern corresponding to that of the phosphor strips of one of the three colors. This pattern can be obtained by calculation or by the so-called electron beam printing method, thereafter being used in the making of the optical mask. The manufacture of a three-gun tube as in the present example employs an optical mask having formed thereon a striped pattern of the phosphor strips of only one particular color, such that the phosphor strips of each of the other remaining colors can be formed on the interior surface of the face plate in a predetermined pattern by only shifting the optical mask in parallel.

In accordance with one feature of the present invention, a plate for exposing a photosensitive layer on a screen surface is formed. Referring to FIG. 3, there is depicted a plate 16' of the same configuration as the face plate 16 of the tube 11 desired to be manufactured. The plate 16' is coated over the entire interior surface with a photosensitive material 29. A suitable material is commercially known under the name of KPR, Kodak Photo Resist, admixed with an opaque material such as carbon. The material 29 is sensitive to and hardened by exposure to, or impact of, an electron beam and forms a coating on the interior surface of the plate 16'. Next a grid device 18' identical to the grid 18 of the manufactured tube 11 is positioned aljacent the inner face of the plate 16' at a predetermined location.

After the plate 16' has been prepared as depicted in FIG. 3, it is affixed to a conical portion of an electron beam printing device 30 as shown in FIG. 4. The beam printing device 30 is substantially the same structure as the finished tube 11 except that it is provided with an exhaust pipe 32 from which the air or gas present in the envelope defined by the printing device 30 and the affixed glass plate 16' may be withdrawn. Accordingly, the beam printing device 30 is provided with at least an electron gun device 13', a deflection coil 15' mounted about the junction between the conical portion 14' and the neck portion 12' of the device 30.

In attaching the plate 16' to the device 30 an abutting face 16c of an extending peripheral flange 16a' of the plate 16' is joined to a similar shaped edge flange 33 of the conical portion 14'. After the light plate 16' is affixed to the printing device 30, the device 30 is evacuated to the exhaust pipe 32 and is held under a pressure of $5 \times 10^{-5}$ mm. Hg. The junction between the edge 16c and the edge 33 is preferably sealed by applying a seal material such as grease to the abutting face surfaces to make an airtight joint between the plate 16' and the device 30.

The beam printing device 30 is held under a pressure as above which will be employed in actual operation of the television receiver. Under these conditions an accelerating voltage and a deflection voltage are then applied respectively to the electron gun device 13' and the deflection coil 15' and a potential is applied to the grid device 28'. The electron beam from the electron gun 13' focused by the grid device 18' impinges on the coated inner face of the face plate 16', in the usual scanning manner at locations which are to be occupied ultimately by the green phosphor strip 17G creating green image areas. The layer 29 is thus hardened at the points where the electron beam strikes.

Subsequent to the electron beam printing, the plate 16' is disassembled from the conical portion 14' of the electron beam printing device 30 and the inner face of plate 16' is rinsed with water to wash away selectively the layer 29 at those locations which have not been exposed to the electron beam. This leaves the layer 29 at those areas which correspond to the green phosphor strip 17G in the finished color picture tube 11.

Figure 5:
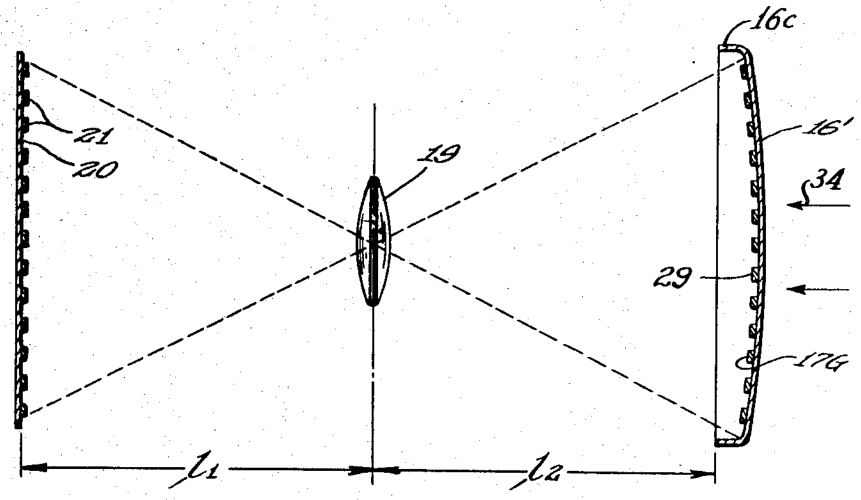

Referring to FIG. 5, a flat glass plate or film 20 colored with a positive photographic emulsion layer 21 is disposed opposite the inner face of the face plate 16' and a lens 19 is interposed therebetween. The lens 19 is disposed at a distance $l_1$ from the glass plate 20 and a distance $l_2$ from the edge flange 16c raised about the periphery of the plate 16'. The relative arrangement of the lens 19 to the glass plate 20 and the plate 16' is selected such that the striped pattern formed by the layer 29 on the plate 16' is projected exactly on the emulsion-coated surface of the glass plate 20. The glass plate 20 is of substantially the same size as the plate 16'. The emulsion deposited surface of the glass plate 20 is exposed to irradiation by light indicated by the rays 34 directed from the outside of the face plate 16' to print the striped pattern of the layer 29 on the emulsion-coated surface of the glass plate 20. The glass plate 20 has formed thereon latent image areas which correspond to the striped pattern of the green phosphor strips 17G and is subjected to developing and fixing processes to leave thereon the emulsion layer 21 in a striped pattern which is in accordance with the pattern formed by the layer 29 on the inner face of the plate 16'.

The next step in the production of an optical mask for optical printing use is accomplished by making use of the glass plate 20 having formed thereon the positive pattern by the strips of the emulsion layer 21. For this purpose, a slightly curved plate 22 which is of the same configuration as the face plate 16 and coated over the interior with a negative photographic emulsion layer, is located in close proximity to the glass plate 20, FIG. 6. The negative photographic emulsion coated interior surface of the curved plate 22 is exposed to irradiation by light directed from a light source $L_1$ placed at a location spaced a distance $l_1$ from the glass plate 20, printing the photograph image of the glass plate 20 on the curved plate 22.

The curved plate 22 is then subjected to developing and fixing processes so that the negative photographic emulsion layer remains on the curved plate 22 in a striped pattern in accordance with the photographic image of the glass plate 20, thus producing an optical mask 22'. The optical mask 22' thus formed is exactly the same striped pattern as that produced in the purocess of FIG. 5 and is transparent at places corresponding to the green phosphor strips 17G which will be deposited on the screen of the finished color picture tube.

Figure 7:
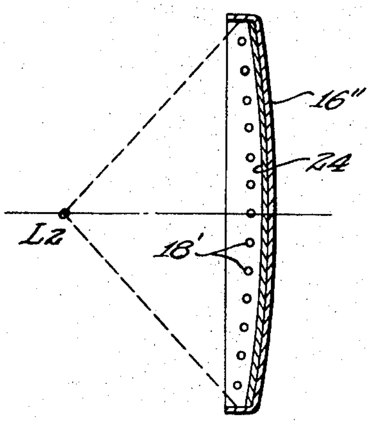
FIGS. 7, 8 and 9 are schematic diagrams illustrating the manner in which the optical mask and the face plate are positioned relative to each other.
Figure 8:
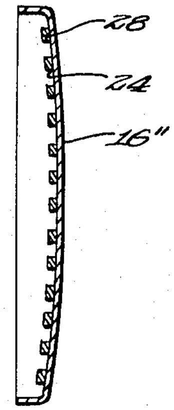
Figure 9:
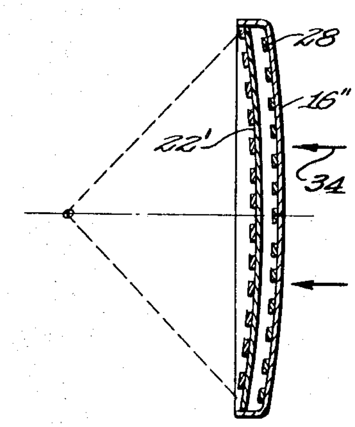

In the making of a color screen with the optical mask 22' produced as above, the first step is to precisely position the optical mask 22' and a face plate 16'' which is to form a color screen in the finished color picture tube. The entire inner face of the face plate 16'' is coated with a photosensitive material layer 24. A focusing grid 18' is assembled with the face plate 16'' at a predetermined position as depicted in FIGS. 7 to 9.

Figure 10:
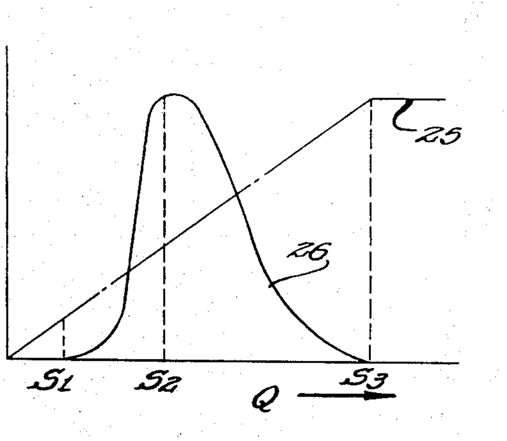
FIG. 10 is a graph of characteristic curves showing the properties of a photosensitive material to be employed in this invention.

The photosensitive material layer 24 may be a mixture which is composed of 40 parts by weight of polyvinyl alcohol 7% aqueous solution, 3 parts by weight of ammonium dichromate 10% aqueous solution, 34 parts by weight of methanol and 24 parts by weight of water. Such a photosensitive material layer becomes hard substantially in proportion to exposure Q as indicated by the curve 25 in FIG. 10 and its adhesion abruptly increases from a point $S_1$ of exposure and reaches a maximum value at a point $S_2$ of exposure. From $S_2$ on the adhesion decreases with an increase in exposure and finally becomes approximately zero at point $S_3$ of exposure, as indicated by the curve 26 of FIG. 10.

After assembling of the grid 18' with the face plate 16'', the entire surface of the photosensitive material layer 24 is exposed to light from a convex side of the face plate 16'' up to the value $S_2$ and then the surface of the photosensitive material layer 24 is exposed again to irradiation up to the value $S_3$ by light through the lines of grid 18' from a light source $L_2$ placed at an apparent deflection center.

Following this, the photosensitive material layer 24 is coated with a light transmitting inhibiter slurry 28 composed of, for example, zinc oxide powder kneaded with water and alcohol. The slurry 28 adheres to the photosensitive material layer 24 only on those areas which have been masked from the light by the grid elements of the grid 18'. The face plate 16'' is then washed off by rinsing with water leaving the slurry 28 on the inner face of the face plate 16'' in strips in accordance with the strip pattern formed by the grid elements of the grid elements of the grid 18', FIG. 8.

Since the slurry 28 is thus deposited on the inner face of the face plate 16'' in accordance with the shadow image of the grid 18' to be actually used in the finished color picture tube, the relative positions of the optical mask 22' and the face plate 16'' can be precisely adjusted.

The optical mask 22' is disposed opposite the face plate 16'', and a light source 47 is placed in an apparent deflection center in such a case there appears in the face plate 16'' a spurious pattern, moire pattern 36, which is produced by interference of light between the patterns of the stripes 28 which correspond to the grid 18' and the mask 22'. The location of the mask 22' relative to the face plate 16'' is adjusted such that the moire pattern 36 becomes bilaterally symmetrical as shown in FIG. 11.

In the adjustment of the relative positions of the optical mask 22' and the face plate 16'', the use of an exposing device 40 such as shown in FIG 12 is convenient for the positioning thereof and for the subsequent formation of the color screen. The exposing device 40 consists of a case 41 and a base plate 42 for mounting the face plate 16'' on the case 41. The face plate 16'' is disposed in position while being shifted vertically and horizontally by adjusting means 43 including screws provided on the upper surface portion of the base plate 42. In the case 41 there is provided a support member 44, by which a bed 45 for holding the mask 22' is supported on the adjusting means 46, and the location of the mask 22' is adjusted in a vertical direction by the adjusting means 46.

The light source 47 positioned at an apparent deflection center is used in the positioning of the optical mask 22' and the face plate 16'' relative to each other. The face plate 16'' is disassembled from the exposing device 40 and the slurry layers 28 still remaining on the inner face of the face plate 16'' are washed off by rinsing. The rinsing is accomplished with a 5% aqueous solution of acid ammonium fluoride. The green phosphor strips 17G are subsequently formed on the face plate 16'' in predetermined positions without error due to the positioning of the face plate 16'' and the optical mask 22' which has been accomplished as above.

The deposition of the color phosphor strips on the face plate 16'' is accomplished in an order such as shown in FIGS. 13A to 13E. The inner face of the face plate 16'' is coated with a slurry 48 consisting of a green phosphor admixed with polyvinyl alcohol, ammonium dichromate and so on and the face plate 16'' is then mounted on the exposing device 40 in predetermined opposing relation to the optical mask 22'.

Figure 13:
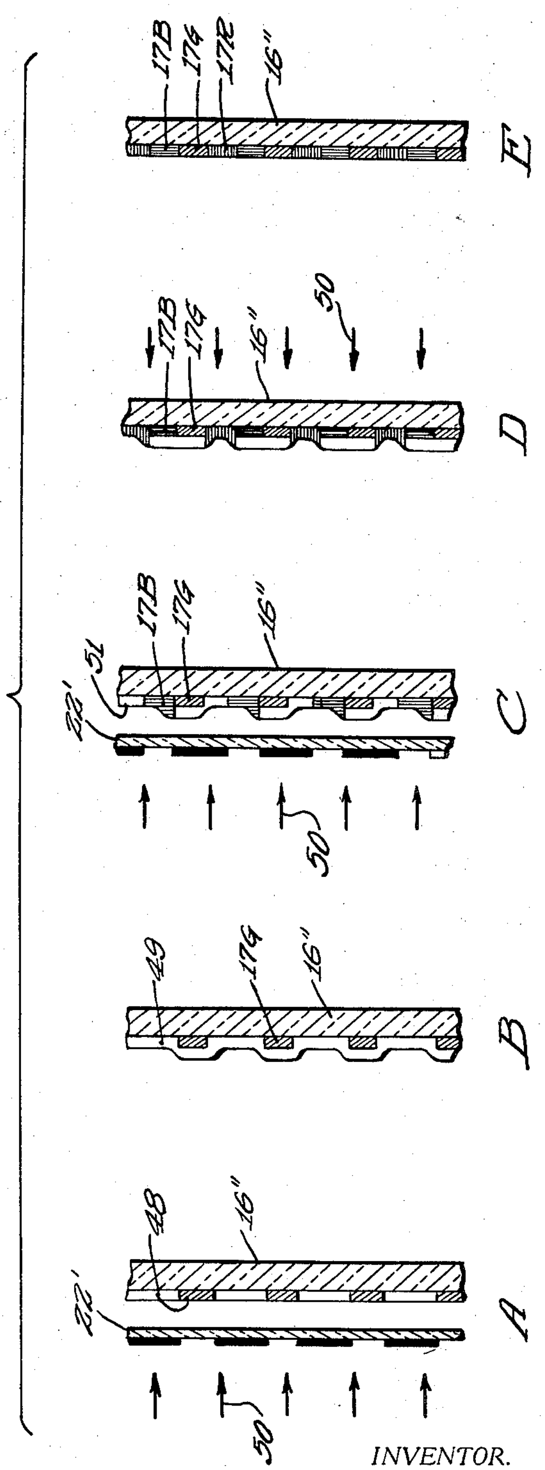

The coated inner face of the face plate 16'' is exposed to irradiation by light indicated by arrows 50 from the light source 47 up to a predetermined exposure value through the optical mask 22' to harden the slurry layers 48 at areas which correspond to the transparent portions of the mask 22' as shown in FIG. 13A. The exposed inner face of the face plate 16'' is then subjected to a developing process to remove the slurry layer 48 selectively on those areas which have not been exposed to light. Subsequent to the deposition of the green phosphor strip 17G, a blue slurry 49 is deposited on the inner face of the face plate 16'' as shown in FIG. 13B. In this case, the optical mask 22' is shifted a distance corresponding to the width of one phosphor strip, and the inner face of the face plate 16'' is then exposed to light in a similar manner to harden the slurry layer 49 at those areas which correspond to the transparent portion of the optical mask 22', FIG. 13C.

The exposed inner face of the face plate 16'' is likewise subjected to the developing process to remove the excess slurry layer unexposed to the light and leave a blue phosphor strip 17B. The deposition of a red phosphor slurry 51 next is accomplished in the same manner as that in the previous processes by exposing the red phosphor slurry layer coated on the inner face of the face plate 16'' to light through the optical mask 22' similarly shifted to a predetermined position. However, where the green and blue phosphors are opaque or added with an opaque material which can be removed by baking, red phosphor slurry layer 51 is deposited over the entire inner face of the face plate 16'' and is then exposed to irradiation by light, indicated by arrows 50, directed from the outside of the face plate 16'' as shown in FIG. 13D, thereby hardening the red phosphor slurry layer 51 at those areas which have been exposed to light. In the final stage, the excess slurry layer unexposed is removed to obtain a desired colored phosphor screen as depicted in FIG. 13E.

In accordance with the invention, the face plate 16″ and the optical mask 22′ are positioned while observing the moire pattern 36 resulting from interference due to disagreement between the pattern formed by the strips 28 on the face plate 16″ corresponding to that of the grid 18′ and the pattern of the optical mask 22′ to place the mask 22′ close to the face plate 16″ and consequently the moire pattern can be obtained clearly.

This facilitates precise positioning of the face plate 16″ and the optical mask 22′. Moreover, the striped pattern of the mask 22′ is projected on the phosphor layer of the face plate 16″ located in close proximity to the optical mask 22′, and thus even if a light source 47 is not an ideal point source of light, the shadow image of the mask 22′ appears sharply.

Therefore, the light source 47 may be relatively large and intense, which leads to reduction of the time for exposure and clear distinction of the demarcation between the phosphor strips. Accordingly, the width of each phosphor strip 17 can be made small. In addition, the optical mask and the face plate can be precisely positioned relative to each other by the use of the exposing device and such positions can be recorded in order that a plurality of phosphor strips can be deposited on the face plate at predetermined locations by merely shifting the optical mask in a horizontal direction.

The optical mask 22′ employed in the foregoing has the same curved surface as the face plate 16″ desired to be ultimately manufactured. However, such a particular optical mask is not required in the making of a color phosphor screen for use with minature picture tubes and color phosphor strips can be deposited on the face plate precisely in a predetermined striped pattern by a partial retouching of a striped pattern produced on an optical mask formed from a flat glass plate.

While the present invention has been described with refeernce to the manufacture of a color phosphor screen for a color picture tube of the type that both electron beam focusing and color selecting are accomplished by the grid, the present invention is applicable to the production of a color phosphor screen for color picture tubes in which only color switching is effected by the grid. Furthermore, this invention is also applicable to the making of a color phosphor screen composed of dot-like phosphors which would be used with color picture tubes employing linear grids and shadow-mask type focusing grids having formed therein circular apertures.

Although minor modifications might be suggested by those versed in the art, it should be understood that I wish to embody within the scope of the patent warrented hereon all such embodiments as reasonably and properly come within the scope of my contribution to the art.

I claim as my invention:

1. The method of making a color screen for a color television tube comprising the steps of: mounting post-deflection focusing means adjacent a plate, printing a shadow image of the post-deflection focusing means on the plate, preparing an optical mask from said printed plate, mounting post-deflection focusing means adjacent a face plate, printing a shadow image of the post-deflection focusing means on said face plate, adjusting the relative positions of the optical mask and the face plate so that a predetermined relationship exists between the images formed on the optical mask and the face plate, applying a first photo-sensitive color phosphor slurry on the inner face of the face plate, developing and fixing the exposed portion of the first photo-sensitive phosphor to form a first plurality of generally parallel phosphor strips of a first color, applying a second photo-sensitive phosphor slurry on the inner face of the face plate, adjusting the positions of the optical mask and the face plate to a second position, and exposing the coated inner face of the face plate to the optical mask to expose a portion of the second phosphor slurry on the face plate, and developing said second phosphor slurry to form a second plurality of parallel phosphor strips on the face plate interspersed between said first plurality of phosphor strips.

2. A method of making a color screen as recited in claim 1 wherein the plate has the same configuration as the face plate.

3. A method of making a color screen as recited in claim 1 wherein said post-deflection focusing means comprises a plurality of parallel individual grid wires.

4. A method of manufacturing a color television screen as recited in claim 1 wherein the printed plate has a pattern of transparency corresponding to the phosphor strips to be formed on the screen surface.

5. The method of making a color television screen for a color television tube comprising the steps of coating a photo-sensitive material on the inner face of a plate, mounting post-deflection focusing means adjacent said plate, subjecting the coated inner face of the plate to irradiation by light through the post-deflection focusing means to put a shadow image of the post-deflection focusing means on the photo-sensitive material, removing the post-deflection focusing means from the plate, developing and printing the image on the plate, making an optical mask from said plate, coating a photo-sensitive material on the inner face plate of a color television screen, holding the post-deflection focusing means adjacent said face plate and exposing the coated inner face of the face plate through the post-deflection focusing means to put a shadow image of the post-deflection focusing means on the photo-sensitive material, removing the post-deflection focusing means from the face plate, developing and printing the image on the face plate, positioning the face plate and said optical mask in relative positions in accordance with a predetermined pattern, coating a first photo-sensitive phosphor slurry on the inner face of the face plate, subjecting the coated inner face of the face plate to irradiation by light through the optical mask to expose a portion of the slurry on the face plate, developing the exposed slurry on the face plate, and removing the undeveloped slurry to form a color television face plate with a first plurality of color phosphor strips, readjusting the relative positions of the optical mask and said face plate, coating a second photo-sensitive phosphor slurry on the inner face of the face plate, subjecting the coated inner face of the face plate to irradiation by light through the optical mask to expose said second photo-sensitive phosphor slurry on the face plate, and developing said second photo-sensitive slurry on the face to form a second plurality of color phosphor strips.

6. The method according to claim 5 wherein a third photo-sensitive phosphor slurry is coated on the inner face of the face plate, adjusting the relative positions of the optical mask and said face plate, subjecting the coated inner face of the face plate to irradiation by light through the optical mask to expose said third phosphor slurry on the face plate, and developing the exposed slurry on the face plate to form a third plurality of color phosphor strips.

7. The method according to claim 5 wherein a third photo-sensitive phosphor slurry is deposited on the inner face of said face plate between the first and second purailty of color phosphor strips, exposing said third phosphor slurry from the back side of said face plate, and developing said third phosphor slurry to form a third plurality of phosphor strips of a third color.

8. A method for making a color screen for color television according to claim 1 comprising adjusting the relative position of the optical mask and the face plate in accordance with the predetermined pattern, coating a third photo-sensitive phosphor slurry on the inner face of the face plate, exposing the coated inner face of the face plate to light through the optical mask, and developing the third phosphor slurry to form a third plurality of parallel phosphor strips interspersed between the first and second plurality of phosphor strips.

9. A method of making a color screen according to claim 1 comprising coating said face plate with the first and second plurality of parallel phosphor strips with a third photo-sensitive phosphor slurry, exposing said third phosphor slurry from the back side, and developing said exposed third phosphor slurry so as to form a third plurality of parallel phosphor strips of a third color.

10. A method of making a color screen as recited in claim 5 wherein the post-deflection focusing means comprises a plurality of parallel individual grid wires.

References Cited

UNITED STATES PATENTS

| | | | |
|---|---|---|---|
| 2,568,448 | 9/1951 | Hansen | 96—36.1 |
| 2,727,828 | 12/1955 | Law | 96—36.1 |
| 2,840,470 | 6/1958 | Levine | 96—36.1 |
| 2,897,089 | 7/1959 | Ahlburg et al. | 96—361. |
| 2,989,398 | 6/1961 | Bingley | 96—36.1 |
| 3,067,349 | 12/1962 | Kasperowicz | 96—36.1 |

NORMAN G. TORCHIN, Primary Examiner

J. R. HIGHTOWER, Assistant Examiner

US. Cl. X.R.

117—33.5; 313—92